Patented Apr. 6, 1937

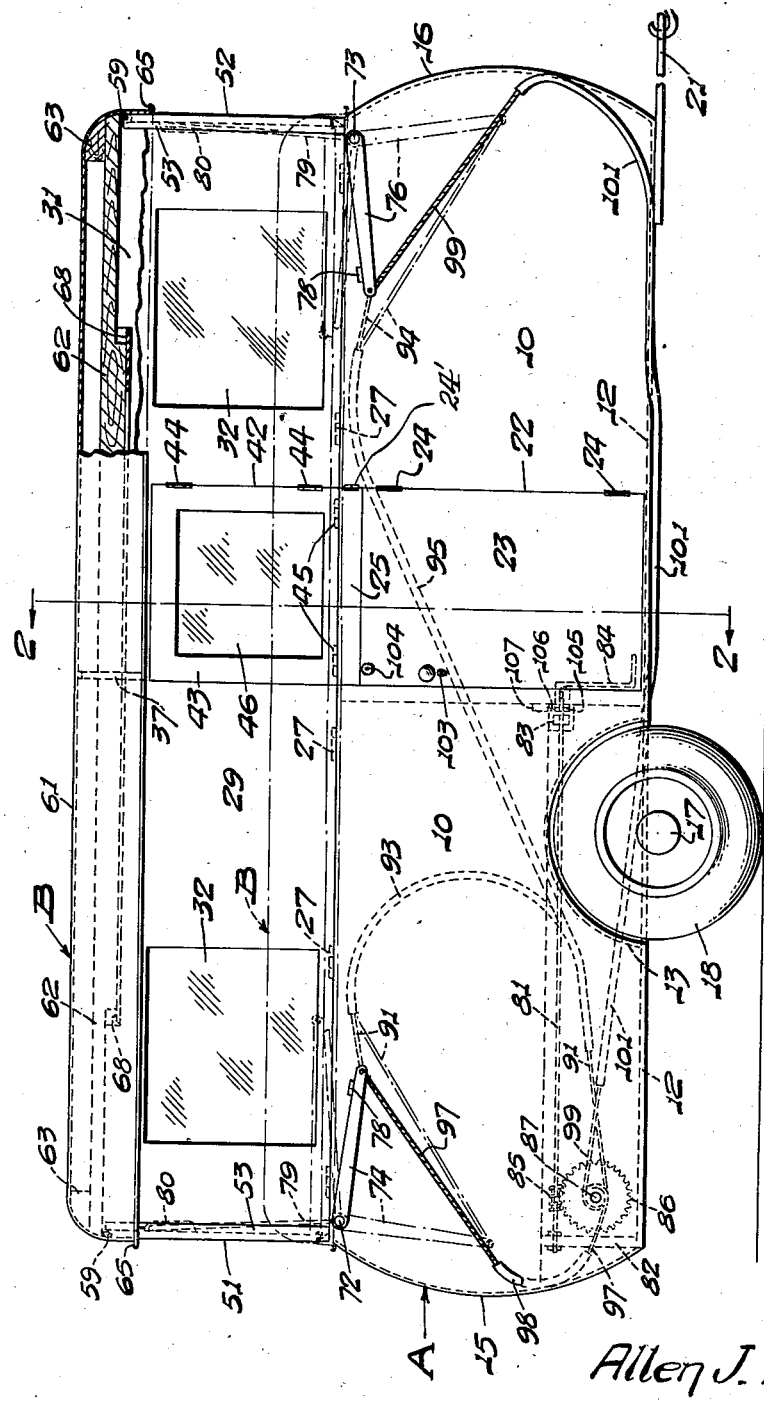

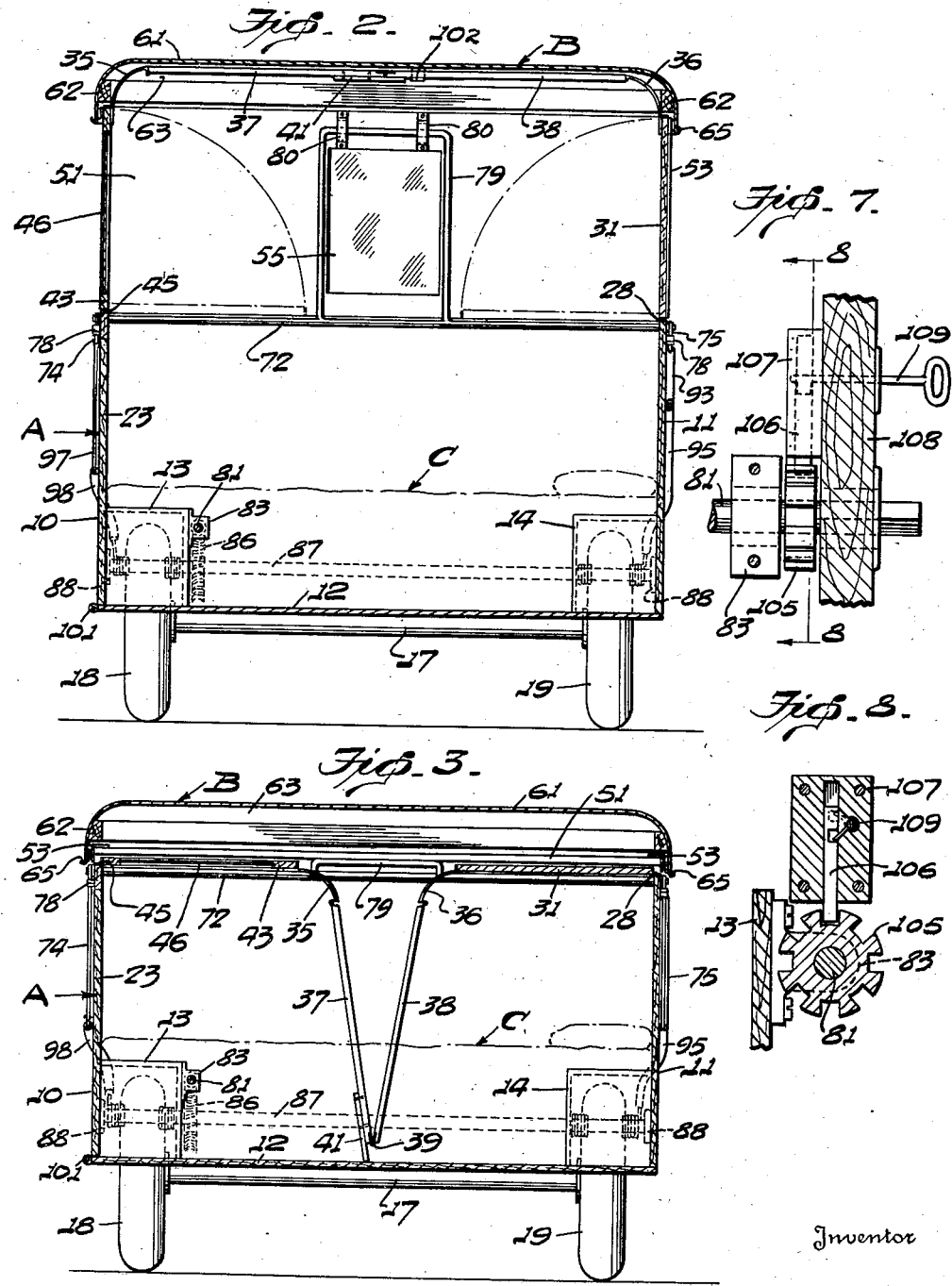

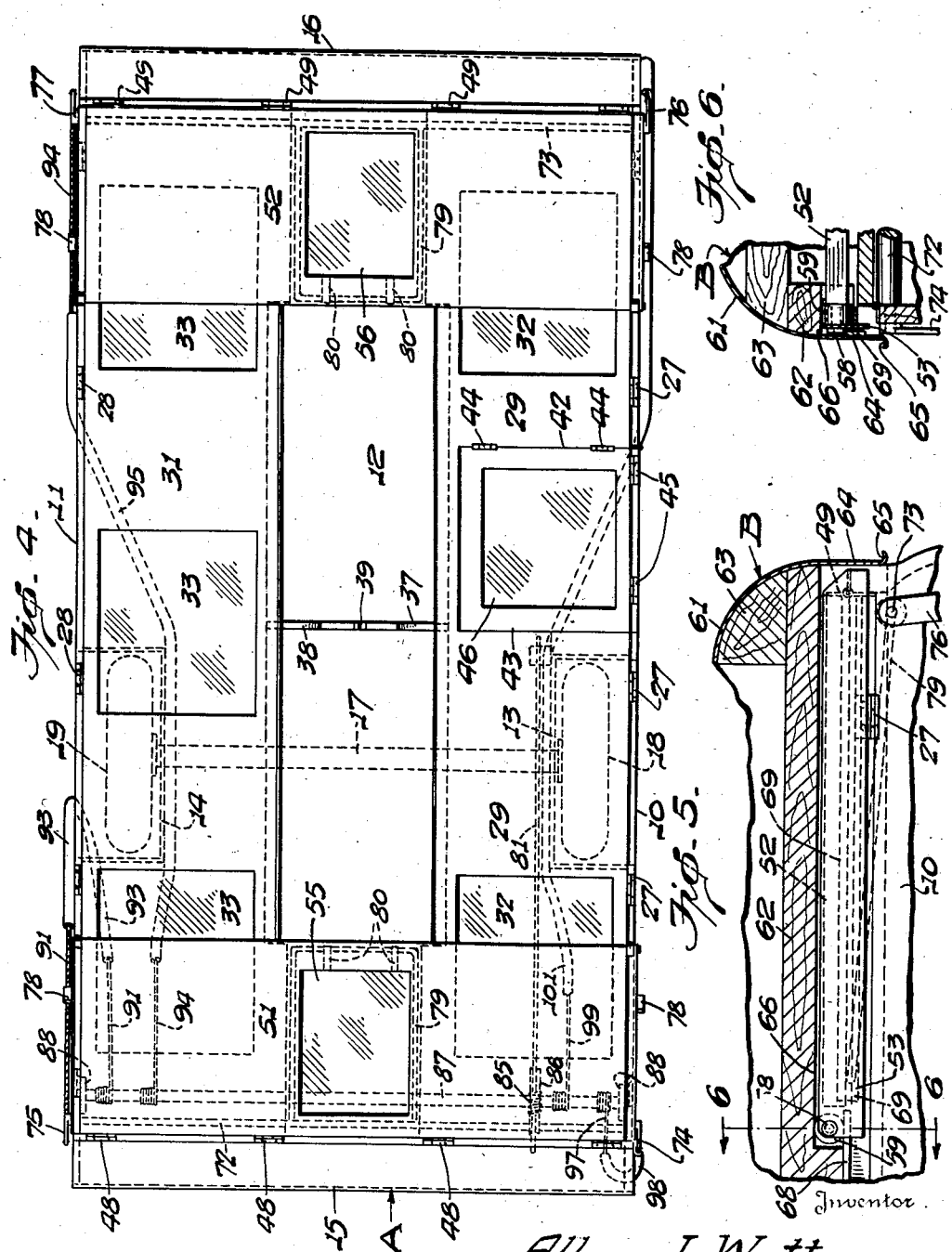

2,076,486

UNITED STATES PATENT OFFICE 2,076,486

CONVERTIBLE VEHICLE

Allen J. Watt, La Fayette, Ohio

Application September 19, 1935, Serial No. 41,324

11 Claims. (Cl. 296—23)

The present invention relates to convertible vehicles and it is more particularly concerned with trailers of the character usually attached to pleasure cars for camping purposes.

In automotive trailers heretofore proposed, the body structure has either been of a non-collapsible nature, with the result that they are top heavy and are unsuited to modern high speed highway travel, or else they have been of a collapsible character. The collapsible trailers found in the prior art are open to several serious objections. For one thing the trailer structure is such that when it is collapsed the trailer cannot be occupied, and with some types of trailers the body space cannot even be used for the storage of camping equipment, baggage and the like. In all of the prior collapsible trailers which are of sufficient size when set up to afford standing room for the occupants the collapsing mechanism is either complex in structure, or difficult of manipulation or both, and in some instances it has been found that trailer parts, when the trailer is collapsed and on the road, come loose and allow sections of the trailer to open up and in some instances become lost.

It is accordingly a primary object of the present invention to provide a novel collapsible automotive trailer which is simple and yet rugged in construction, which provides adequate room for its occupants when set up and yet which is compact and has a low center of gravity when collapsed.

A further important object of my invention is to devise a novel collapsible automotive trailer which provides adequate room for occupants when it is set up and which also provides space for reclining occupants and baggage when it is collapsed.

Another object of this invention is to devise a novel collapsible trailer body construction which may be readily collapsed and set up and yet which is extremely stable in either collapsed or set up condition.

Further objects of the invention will become apparent as the specification proceeds in connection with the annexed drawings, and from the appended claims.

In the drawings:

Figure 1 is a side elevational view of an automotive trailer embodying my invention, illustrating the body structure in set up position, and with parts thereof indicated by dotted lines;

Figure 2 is a sectional view taken on the line 2—2 of Figure 1 looking toward the rear of the vehicle;

Figure 3 is a transverse sectional view through the trailer shown in Figure 1, looking toward the rear thereof, and illustrates the toggle brace connected to the side walls, with the parts in collapsed position;

Figure 4 is a top plan view of the trailer shown in Figure 1, but illustrates the auxiliary side and end walls in collapsed position, and the top removed from the structure to more clearly illustrate the features involved;

Figure 5 is a fragmental sectional view of one corner of the top structure showing how the end walls cooperate therewith;

Figure 6 is a sectional view taken on the line 6—6 of Figure 5, looking in the direction of the arrows;

Figure 7 is a fragmental view, with parts in section, of a locking device which may be used with the lifting shaft of the structure shown in Figures 1 to 6 inclusive; and Figure 8 is a sectional view taken along the line 8—8, looking in the direction of the arrows.

With continued reference to the drawings, wherein like reference characters have been employed to designate like parts throughout the several views thereof, the trailer body is designated generally at A, and comprises a pair of side walls 10 and 11, a floor 12 having wheel housings 13 and 14, and end walls 15 and 16. The end walls are preferably curved, but it is to be understood that they may be plain or streamlined in any suitable manner.

An axle assembly, comprising an axle 17 and wheels 18 and 19 is connected to body A in any suitable well known manner, for instance by semi-elliptic springs (not shown) and the trailer is adapted to be coupled to an automobile in any suitable manner, as for instance by means of a tongue 21.

Side wall 10 is provided with an opening 22 in which is hinged a door 23 by means of hinges 24. Also hinged to swing into opening 22 by means of a hinge 24' is a support 25, for a purpose that will presently appear.

Preferably pivotally connected to the top edges of side walls 10 and 11, by hinges 27 and 28, are auxiliary side-wall forming members 29 and 31 respectively, which are provided with windows 32 and 33. Side members 29 and 31 are adapted to be pivoted about their respective hinges from the upright position shown in Figure 2 into the substantially horizontal position shown in Figure 3, and I preferably employ the following mechanism for facilitating these operations. Referring to Figure 3, secured to the free edge of members 29 and 31 are preferably curved arms 35 and 36 to which are pivotally secured toggle links 37 and 38. The toggle links are pivoted together by means of a hinge 39, and link 37 carries a brace 41, which is employed to prevent the links from breaking too far past dead center when the brace is raised. The toggle links are actuated in a manner to be hereinafter described.

Side wall member 29 is provided with an opening 42 in which is mounted a door section 43 by means of hinges 44. Door 43 is also hinged to support 25 by means of hinges 45, and the latter are disposed to allow door section 43 to fold inward as a unit with side wall member 29. Door 43 may be provided with a window 46 if desired.

Pivotally connected to end walls 15 and 16, by means of hinges 48 and 49 located a slight distance above the plane of the side wall hinges, are auxiliary end-wall forming members 51 and 52 respectively. Each end wall member is provided at its side edges with angle irons 53 (Figure 6), which are adapted to overlap the ends of side wall members 29 and 31 when the latter are disposed in upright position. The end wall members may be provided with windows 55 and 56 if desired, and they constitute the medium for raising the body top into elevated position, and the manner in which this is effected will now be set forth.

Secured to the corner of each free edge of members 51 and 52, and extending through angle irons 53, is a pin 58 upon which is journalled a roller 59. The four rollers 59 cooperate to support a top B, which may assume any suitable form but which preferably comprises a pressed metal cover 61 having a framework made up of longitudinal rails 62 and cross bars 63, secured thereto in any suitable manner.

Cover 61 preferably comprises a flat upper surface and a deep marginal flange 64, terminating in a gutter 65. Each longitudinal rail 62 is rabbetted to provide a roller track 66, and if desired the latter may have a metal strip secured thereto to improve the wearing qualities thereof. Rollers 59 are adapted to cooperate with tracks 66 in the manner seen in Figures 1, 5 and 6; in Figure 1 the top is disposed in elevated position whereas in the latter figures it is shown in lowered position.

In order to restrain top B from being displaced from body A when it is disposed in lowered position I preferably secure a strap iron piece 68 to the under surface of each rail 62, and as seen in Figure 5 roller 59 is disposed between track 66 and piece 68. In a similar fashion top B is maintained in place when in elevated position by means of metal strips 69, which are welded or otherwise secured to the inner surface of flange 63 and which cooperate with the end portions of pins 58 as seen in Figure 6.

End wall members 51 and 52 may be raised into position and restored to lowered position by any suitable means but I preferably employ the mechanism about to be described, as it has proven to be entirely satisfactory in practice. Preferably journalled in side walls 10 and 11 adjacent the end walls are shafts 72 and 73. Rigidly mounted on the ends of shaft 72 is a lowering lever 74 and a lifting lever 75. Similar lowering and lifting levers 76 and 77 are fixed upon shaft 73.

Lowering levers 74 and 76 and lifting levers 75 and 77 cooperate with stops 78 located on the sides of the body, to establish complete stability of the construction when the top is raised into elevated position as will be hereinafter set forth.

Actuating shafts 72 and 73 are each connected to members 51 and 52 by a preferably square frame element, and as they are of identical construction only one will be described. With reference to Figures 1, 2 and 4, a square frame 79 is welded or otherwise rigidly secured to shaft 72 and is adapted to bear against the inner surface of auxiliary end wall 51 and encircles window 55. A pair of stirrup elements 80 are secured to the inner surface of member 51 and sufficient clearance is provided to allow the parts to swing from raised to lowered position. Stirrups 80 are preferably provided so that when shafts 72 and 73 are rocked inwardly from the position shown in Figure 1, members 51 and 52 will be positively pulled into lowered position.

The lowering and lifting levers are preferably actuated synchronously by means of a flexible cable assembly. With particular reference to Figure 1, a shaft 81, journalled at its rear end in a support 82, and at its front in a bearing 83 secured to wheel housing 13, is provided with a detachable crank 84, by means of which it may be rotated. Shaft 81 carries a worm 85 which meshes with a worm gear 86 rigidly secured to a shaft 87. Shaft 87 preferably extends from side to side of the body and is journalled in the sides in any suitable manner, for instance by means of a pair of bearing blocks 88.

Shaft 87 functions as a windlass, and wound thereon is a flexible cable 91, which is led through a lubricated tube 93 to lifting lever 75. As seen in Figure 4, the tube is led forwardly in the body, thence through an opening in wall 11, and is then led rearwardly to the lever. As the tube assumes a gradual curve, and as cable 91 is lubricated therein, the parts work very freely. A second lifting cable 94 is wound on shaft 87 and is led forwardly in a tube 95 and is connected to lifting lever 77.

A lowering cable 97 is wound on the other end of shaft 87 and is led rearwardly and then upwardly and forwardly in a tube 98 and connected to lowering lever 74. A second lowering cable 99 is wound on shaft 87 and is led forwardly and upwardly in a tube 101 and connected to lowering lever 76.

With reference to Figure 1, counter-clockwise rotation of shaft 87 will cause cables 97 and 99 to be simultaneously wound thereupon, thereby pulling levers 74 and 76, rocking shafts 72 and 73 inwardly, and rocking members 51 and 52 inwardly to lowered position. As this is taking place, cables 91 and 94 are simultaneously unwound from shaft 87. It is accordingly seen that by rotating crank 84 in the proper direction end walls 51 and 52 may be positively caused to undergo synchronous lowering or raising movements. Although I have illustrated the raising and lowering cables and levers as being located exteriorly of the body, it is to be understood that they have been so illustrated in order to simplify the disclosure, and that the body will be preferably covered with a sheathing of any suitable character, so as to fully enclose all of the working parts.

*Operation*

Assuming that the parts are in collapsed position, with the top structure B disposed in the lowered dotted line position shown in Figure 1, the parts are extremely stable and the trailer can be subjected to severe abuse over rough roads without any of the parts coming loose or becoming damaged. With the parts in this condition, lowering levers 74 and 76 assume the dotted line positions shown in Figure 1 and by reason of the irreversible worm gear assembly, their cables 97 and 99 can be placed under, and maintained in considerable tension. Levers 74 and 76 therefore, in acting upon stirrups 80, firmly maintain ends 51 and 52 in lowered position, and the latter, acting through rollers 59 and strap iron tracks 68 (Figure 5), maintain top B in telescoped relationship to body A and in contact with shafts 72 and 73.

It should be observed that when the parts are in collapsed condition the trailer not only has a low center of gravity, thereby minimizing the possibility of sidesway on the road, but also the trailer is low and offers a minimum air resistance, which today is a substantial factor in high speed travel. Also, with the trailer collapsed as just described, it may nevertheless be utilized by reclining occupants by unlocking locks 103 and 104 and opening door section 23, because, as seen in Figure 3, the parts, with the exception of the toggle brace, which takes up but little space, do not extend below the upper edge of walls 10 and 11 when they are collapsed. Accordingly, the bed or beds, indicated diagrammatically at C in Figures 2 and 3, may be readily occupied.

When it is desired to set up the trailer, door section 23 is opened and crank 84 is connected to shaft 81 and is rotated in the proper direction to raise members 51 and 52, as previously described. As the lifting operation proceeds, rollers 59 roll upon tracks 66 and smoothly elevate top B. The lifting operation proceeds until the various levers strike stops 78. When this occurs, rollers 59 simultaneously strike flange 64 of top B, with the result that top B is securely held against displacement in a horizontal plane, even when the trailer is driven over the road in this condition. As previously pointed out, top B is restrained against upward displacement from members 51 and 52 by strips 64 on the cover flange.

After the top structure has been raised into elevated position in the manner just described, toggle braces 37 and 38 are grasped and lifted upwardly, thereby causing side walls 29 and 31 to rock upwardly into the plane of walls 10 and 11 where they are stopped by contact with the flanges of angle irons 53 on the end walls. The pressure of the toggle brace may be relied upon to hold it in the position shown in Figure 2, but if desired a releasable latch 102 may be secured to the underside of cover B and cooperate with the toggle brace.

After the side walls have been swung into place the trailer is ready for use and the door sections may be connected together to swing as a unit by lock 104.

If for any reason it is desired to dismantle the trailer, this may be readily effected by lifting the top a slight distance from lower position to bring rollers 59 and pins 58 into a position where they clear members 68 and 69. As seen in Figure 5, strips 69 terminate short of members 68, and hence when the top has been raised into this intermediate position, it may be grasped and lifted clear of the parts.

Although I have shown the end wall forming members as pivoted to the end walls and slidably cooperating with the top, it is to be understood that if desired the relationship of the parts may be reversed without departing from the spirit of my invention. For instance the end wall forming members may be pivoted to the top structure and slidably cooperate with tracks provided on the body and the windlass mechanism disposed in the top structure and the appended claims are intended to embrace my invention when it assumes this form. Moreover, the term "side wall", as employed in the appended claims is generic and is intended to embrace a side wall or an end wall.

The present embodiment of the invention is illustrative and not restrictive, the scope of the invention being indicated by the appended claims, rather than by the disclosure, and all equivalents covered by the invention are intended to be embraced by the claims.

With reference now to Figures 7 and 8, I have illustrated a device for locking crankshaft 81 against rotation and with continued reference to these figures, a toothed member 105 is rigidly secured to shaft 81. Adapted for selective locking engagement with the teeth of member 105 is a bolt 106 which is mounted for sliding movement in a lock body 107. Lock body 107 may be of any well known character and it is mounted on a panel 108 enclosing wheel housings 13 and 14 and is adapted to be operated by a key 109. The square end of shaft 81 projects into an opening in panel 108 and is adapted to be operated by crank 84 in the manner previously described.

With the parts in the positions shown in Figures 7 and 8, shaft 81 is locked against rotation, and assuming that the top is in its lowered position, vibrations incident to travel of the vehicle are incapable of allowing shaft 81 to rock, and hence the top is positively locked in position. The same is true when key 109 has been used to withdraw bolt 106 from engagement with member 105; shaft 81 has been rotated to bring the top into its elevated position and bolt 106 has been reengaged with member 105.

Since worm 85 and gear 86 constitute an irreversible driving connection, the primary purpose of the lock just described is to prevent un-authorized operation of the mechanism, but it also prevents vibration of the vehicle from working the parts loose. Therefore, when the mechanism is equipped with the lock just described worm 85 and gear 86 may be replaced by bevel gears or other reversible driving connection if desired.

I claim as my invention:—

1. In a convertible vehicle construction, a wheeled body, a side-wall forming member disposed at each end of said body and pivotally connected thereto to rock about a substantially horizontal axis, a top-forming structure having guide means resting upon said members, said structure being operable to house said body when said members are disposed in a substantially horizontal plane, and means for synchronously rocking said members upwardly in opposite directions toward a substantially vertical position, to thereby cause them to slidingly cooperate with said guide means and raise said top forming structure vertically into a position vertically spaced from said body.

2. The convertible vehicle construction described in claim 1, wherein said top-forming structure is provided with means for automatically arresting said members after they have attained said substantially vertical position.

3. In a convertible vehicle construction, a body structure having side and end walls, a pair of auxiliary end walls mounted upon said end walls and movable from a substantially horizontal position to a substantially vertical position, a top structure resting upon the free ends of said auxiliary end walls, a shaft mounted for rocking movement adjacent the upper edge of each of said end walls, at least one lever means mounted on each of said shafts, and means for simultaneously rocking said lever means in opposite directions and raising said auxiliary end walls from horizontal position toward vertical position, to thereby lift said top structure into elevated position.

4. The convertible vehicle construction described in claim 3, wherein said means for simultaneously rocking said lever means comprises means for locking said shafts against rocking movement, to thereby maintain said top in lowered or elevated position.

5. The convertible vehicle construction described in claim 3, wherein said auxiliary end walls and said shafts are mounted for rocking movement about different axes, together with a second lever mounted on each of said shafts and operable to bear against said auxiliary end walls.

6. In a convertible vehicle, in sub-combination, a top structure having a substantially horizontally disposed track on its lower surface, a sidewall forming member mounted for rocking movement about a substantially horizontal axis, said member having a pin element in the free edge thereof, a roller element journalled upon said pin and cooperating with said track to support said top structure, and a horizontally disposed abutment provided on said top structure and cooperating with the lower side of one of said elements to prevent removal of said top structure from said member when the latter is disposed in at least one of its rocked positions.

7. The construction described in claim 6, wherein said abutment is provided on a downwardly extending wall provided on said top structure and cooperates with said pin element.

8. In a convertible vehicle, a body having substantially upright side and end walls, auxiliary walls pivotally connected to the upper edges of said end walls and said side walls, for rocking movement about substantially horizontal axes from a substantially horizontal position within said body to upright positions to form extensions of said side and end walls, a top structure overlying said body and having a downwardly extending flange around the periphery thereof, said top structure also providing a plurality of substantially parallel, horizontal, downwardly facing guides, said top structure resting upon two of said auxiliary walls with the free ends of the latter engaging said guides, means for simultaneously rocking said two auxiliary walls upwardly about their axes to cause their free ends to slidably cooperate with said guides and raise said top structure vertically, and means for raising said other auxiliary walls into upright positions, said flange overlapping said auxiliary walls when the latter are in raised position, to thereby provide a stop therefor and to also afford a weather-tight joint between said top structure and said auxiliary walls.

9. The convertible vehicle described in claim 8, wherein said top structure comprises a single sheet of pressed steel providing a substantially flat roof portion of generally rectangular shape having a continuous marginal flange formed thereon which extends downwardly a considerable distance, said flange fitting around the upper ends of the side and end walls of said body when said top structure is disposed in lowered position.

10. In a convertible vehicle construction, a body structure having a door opening in one side wall thereof, a side wall member pivoted for movement about a substantially horizontal axis located adjacent the upper edge of said body structure and operable to be folded from a substantially vertical position to a substantially horizontal position, said side wall member having a door opening vertically aligned with the door opening of said body, an upper door section pivoted to said side wall member for closing the door opening therein and having its lower edge terminating adjacent the lower edge of said side wall member, an intermediate door section pivoted to said body and hinged to the lower edge of said upper door section for pivotal movement about an axis disposed in substantial alignment with the pivotal axis of said side wall member, a lower door section hinged to said body structure and having its upper edge terminating adjacent the lower edge of said intermediate door section, said upper intermediate and lower door sections being swingable about a substantially vertical axis, and means for releasably securing said intermediate door section to said lower door section.

11. The convertible vehicle construction described in claim 1, together with means provided on said top-forming structure for interlockingly cooperating with the upper edges of said side wall forming members for preventing removal of said top-forming structure therefrom when the latter is disposed in raised position.

ALLEN J. WATT.